United States Patent
Fathollahi et al.

(10) Patent No.: US 9,521,889 B2
(45) Date of Patent: Dec. 20, 2016

(54) CASE FOR MOBILE DEVICE

(71) Applicant: INCIPIO, LLC, Irvine, CA (US)

(72) Inventors: Andy Fathollahi, Corona Del Mar, CA (US); Timothy A. Hemesath, Clovis, CA (US); Blake H. Robertson, La Mesa, CA (US)

(73) Assignee: INCIPIO, LLC, Irvine, CA (US)

( * ) Notice: Subject to any disclaimer, the term of this patent is extended or adjusted under 35 U.S.C. 154(b) by 9 days.

(21) Appl. No.: 14/213,581

(22) Filed: Mar. 14, 2014

(65) Prior Publication Data

US 2014/0262934 A1 Sep. 18, 2014

Related U.S. Application Data

(60) Provisional application No. 61/799,926, filed on Mar. 15, 2013.

(51) Int. Cl.

| | |
|---|---|
| *B65D 85/00* | (2006.01) |
| *A45C 13/00* | (2006.01) |
| *A45C 11/00* | (2006.01) |
| *H04B 1/3888* | (2015.01) |
| *H04M 1/18* | (2006.01) |
| *H04M 1/02* | (2006.01) |

(52) U.S. Cl.
CPC ............ *A45C 13/002* (2013.01); *A45C 11/00* (2013.01); *H04B 1/3888* (2013.01); *H04M 1/185* (2013.01); *A45C 2011/002* (2013.01); *H04M 1/0214* (2013.01)

(58) Field of Classification Search
CPC ............ A45C 13/002; A45C 2011/002; H04M 1/0214
USPC ................ 206/37–39, 305, 320; 361/679.01, 361/679.02; 455/575.1, 575.3, 575.8
See application file for complete search history.

(56) References Cited

U.S. PATENT DOCUMENTS

| | | | | |
|---|---|---|---|---|
| 5,348,347 A | * | 9/1994 | Shink | B42D 5/006 206/38 |
| 6,264,029 B1 | * | 7/2001 | Motson | A45C 13/02 206/320 |
| 8,403,136 B1 | * | 3/2013 | Tsai | H05K 5/061 206/320 |
| 8,439,191 B1 | * | 5/2013 | Lu | H04B 1/3888 206/320 |
| 8,517,172 B1 | * | 8/2013 | Chang | G06F 1/1626 206/320 |
| 8,706,176 B1 | * | 4/2014 | Jia | H04M 1/04 206/320 |
| 8,763,795 B1 | * | 7/2014 | Oten | A45C 11/00 206/320 |

(Continued)

OTHER PUBLICATIONS thegamerwithkids.com, TAVIK Fletch Premium Leather Wallet Case for iPhone 5/5S (Review), Oct. 30, 2013, (6 pages).

(Continued)

*Primary Examiner* — Luan K Bui
(74) *Attorney, Agent, or Firm* — Manatt, Phelps & Phillips, LLP

(57) ABSTRACT

A case a mobile device is provided comprising an outer cover and a shell sized to contain a mobile device. The outer cover can include a first member, a second member, and a flexible member. The shell can include a back panel and a protrusion extending along a perimeter of the back panel. The shell may be reversibly attached to the second member of the outer cover.

19 Claims, 18 Drawing Sheets

(56) References Cited

U.S. PATENT DOCUMENTS

| | | | | |
|---|---|---|---|---|
| 8,887,910 B2* | 11/2014 | Ashley | ............... | A45C 11/00 |
| | | | | 206/320 |
| 2011/0036876 A1* | 2/2011 | Fathollahi | ............ | H04B 1/3888 |
| | | | | 224/191 |
| 2011/0233912 A1* | 9/2011 | Reising | ............... | A45C 11/00 |
| | | | | 281/20 |
| 2012/0012483 A1* | 1/2012 | Fan | ............... | F16M 11/10 |
| | | | | 206/320 |
| 2012/0043234 A1* | 2/2012 | Westrup | ............... | A45C 3/02 |
| | | | | 206/320 |
| 2013/0134061 A1* | 5/2013 | Wu | ............... | G06F 1/1626 |
| | | | | 206/320 |
| 2013/0146491 A1* | 6/2013 | Ghali | ............... | G06F 1/1626 |
| | | | | 206/320 |
| 2013/0264235 A1* | 10/2013 | Lin | ............... | A45C 11/00 |
| | | | | 206/320 |

OTHER PUBLICATIONS gstylemag.com, TAVIK Fletch Premium Leather Wallet Case for iPhone 5/5S (Review), Oct. 30, 2013, (8 pages).

* cited by examiner

CASE FOR MOBILE DEVICE

INCORPORATION BY REFERENCE TO RELATED APPLICATION

This application claims benefit under 35 U.S.C. §119(e) from U.S. Provisional Application No. 61/799,926, filed on Mar. 15, 2013, the disclosure of which is incorporated herein by reference in its entirety.

BACKGROUND OF THE INVENTION

Field of the Invention

This application relates to protective cases for a mobile device.

Description of the Related Art

Mobile devices are often known to sustain damage in many different ways including from being dropped by a user or to fall off of objects such as a table, water damage, etc. The damage may sometime result in a cracked screen, lost button, cracked mobile device body, etc. Thus cases have been provided to protect a mobile device from many different types of damage.

SUMMARY

A detachable case and cover for a mobile device is discussed herein. A protective case can be provided for a mobile device including a detachable cover. The case and cover can allow for use of the mobile device within the case whether the case is attached or detached from the cover. The cover can also provide storage options for cards, money, etc.

DETAILED DESCRIPTION OF PREFERRED EMBODIMENTS

The mobile device case assembly described herein may include two separate components—an outer cover 100 and a mobile device shell 200. In some embodiments, the mobile device shell 200 may be reversibly attached to the outer cover 100 such that a user of the mobile device case assembly can use the mobile device shell 200 with or without the outer cover 100. As such, the mobile device case assembly described herein may be used in at least two separate configurations based upon the user's preference.

The detailed description contained herein references directional terminology such as, but not limited to, "front", "back", and "rear." Such terms are used solely to provide a greater degree of clarity for understanding an embodiment of the device and should not be read as limiting the components to functionality or assembly based upon such directional terminology.

Figure 1:
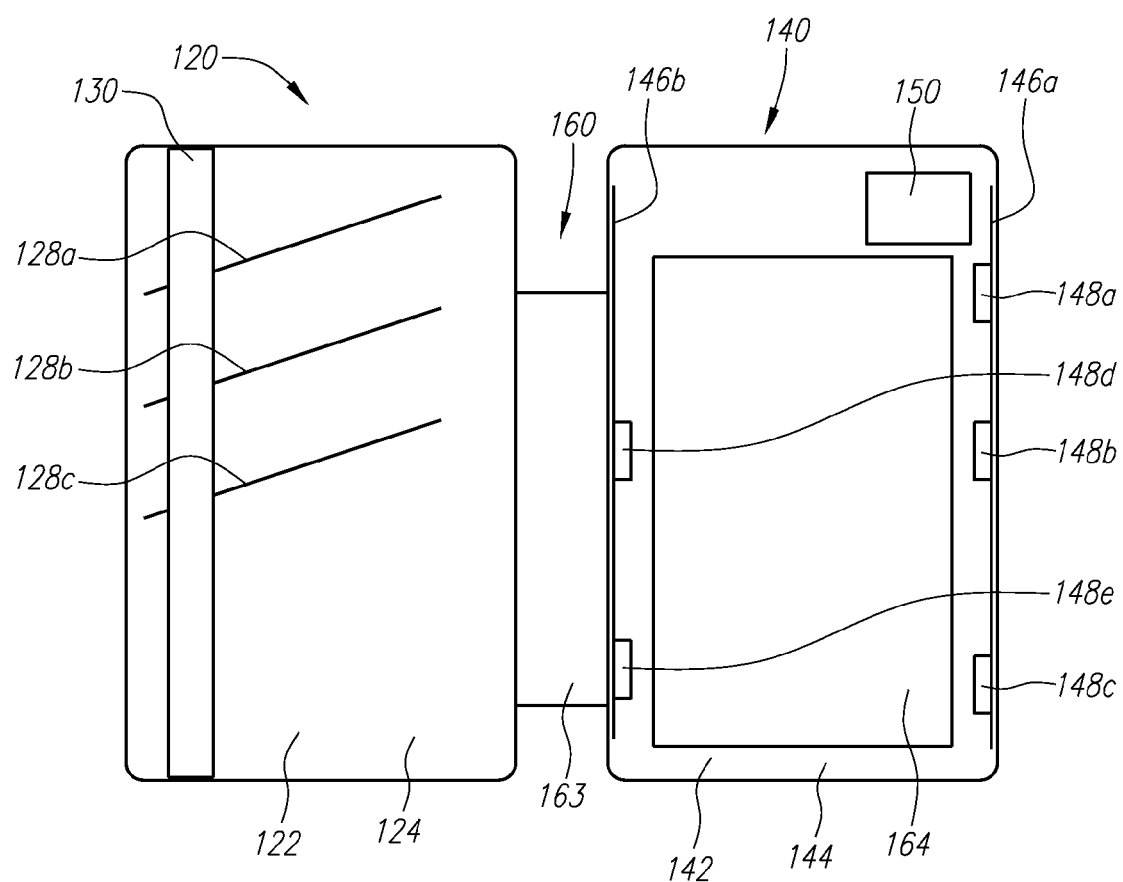
FIG. 1 is a front view of an embodiment of an outer cover of the case which shows the inner surfaces of the outer cover.
Figure 2:
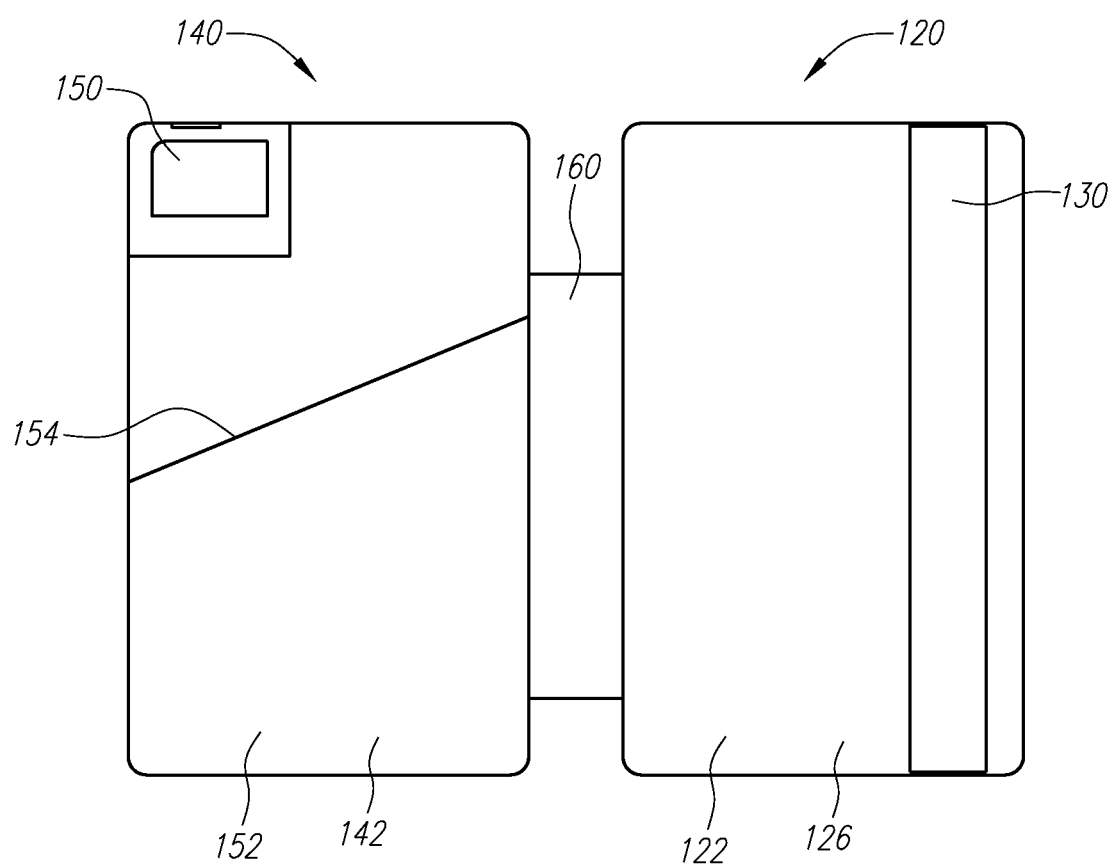
FIG. 2 is a back view of the outside of an embodiment of an outer cover of the case which shows the outer surfaces of the outer cover.
Figure 3:
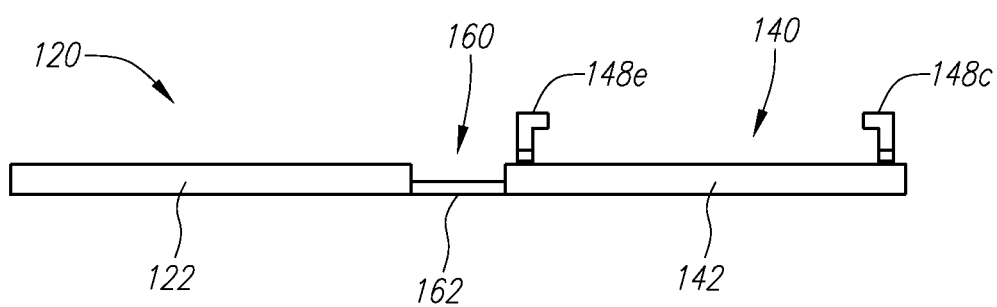
FIG. 3 is a bottom view of an embodiment of an outer cover.

FIGS. 1-3 are illustrations of an embodiment of an outer cover 100 of the mobile device case assembly. With reference to FIG. 1 which is a view of the inside of the outer cover 100, the outer cover 100 may include a first member 120, a second member 140, and a flexible member 160. In some embodiments, first member 120 may be a planar member such as a front panel 122 configured to cover a front surface, such as a screen or touchscreen, of a mobile device inserted into the mobile device case assembly. As such, in some embodiments, the front panel 122 is preferably dimensioned to be slightly greater than the mobile device. Furthermore, in some embodiments, the corners of front panel 122 are rounded. Front panel 122 may be manufactured from materials such as metals, composites, plastics, rubbers, leathers, or other polymers. In some embodiments, the front panel 122 may be manufactured from multiple layers. In some embodiments, the inner surface 124 of the panel 122 may be a soft fabric to reduce likelihood of damaging the front surface of the mobile device, the outer surface 126 may be a durable fabric or leather, and a middle component may be a rigid material such as metal or plastic to provide a greater degree of protection for the front surface of the mobile device.

In some embodiments, such as that illustrated in FIG. 1, front panel 122 may include pockets 128a, 128b, and 128c. In the illustrated embodiment, the pockets 128a, 128b, and 128c have openings in the form of slits sized such that a user of the outer cover 100 may insert items such as a credit card, business card, currency, and the like into the pockets. In some embodiments, the first member 120 may additionally include an elongate strap 130 attached near the top edge and near the bottom edge of the front panel 122. The elongate strap 130 may be made of an elastic material configured to allow the elongate strap to stretch to hold additional items and/or may be configured to serve as a locking mechanism for the mobile device case assembly when the first member 120 is positioned to cover a front surface of the mobile device. Elongate strap may also extend around the outer surface 126.

With reference to FIG. 1, in some embodiments, second member 140 may include a rear panel 142 configured to be reversibly attached to a mobile device shell 200 (described in further detail with respect to FIG. 3). As such, in some embodiments, the rear panel 142 is preferably dimensioned to be slightly greater than the mobile device shell 200 and in some preferred embodiments, may have the same dimensions as the front panel 122 of the first member 120. Rear panel 142 may be manufactured from materials such as metals, composites, plastics, rubbers, leathers, or other polymers. In some embodiments, rear panel 142 may be made of a material of sufficient stiffness such as metal or plastic to provide a greater degree of protection for the rear of the mobile device. Such material may also be slightly elastic to allow for some degree of deformation.

In some embodiments, on the inner surface 144, rear panel 142 may have raised edge protrusions 146a and 146b configured to facilitate placement of mobile device shell 200 on panel 142. In the illustrated embodiment, raised edge protrusions 146a and 146b are located along the perimeter of the rear panel 142. In some embodiments, the raised protrusions may extend along the entire perimeter of the rear panel 142.

Figure 4:
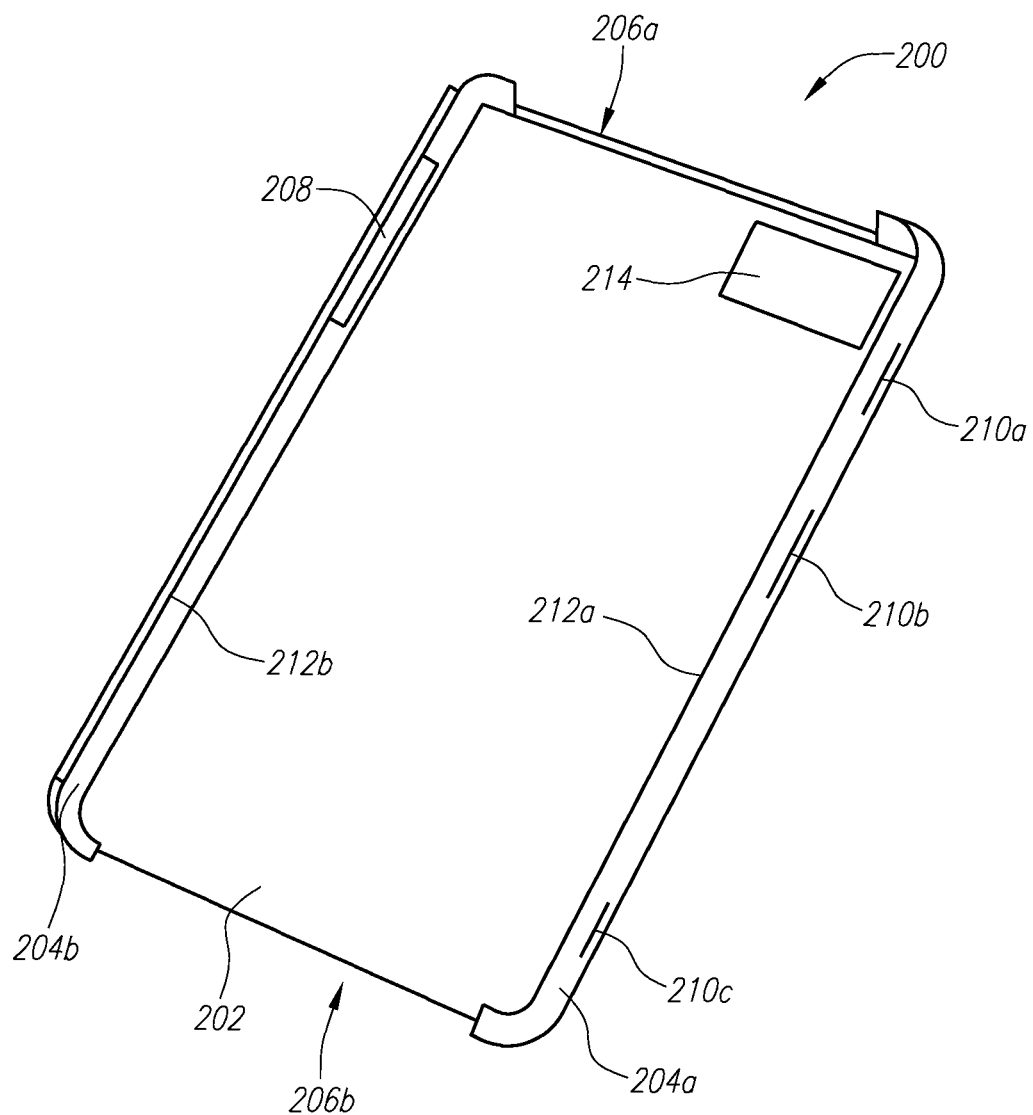
FIG. 4 is a perspective view of an embodiment of a mobile device shell of a case that is dimensioned to receive and retain the mobile device for which it is designed.
Figure 5:
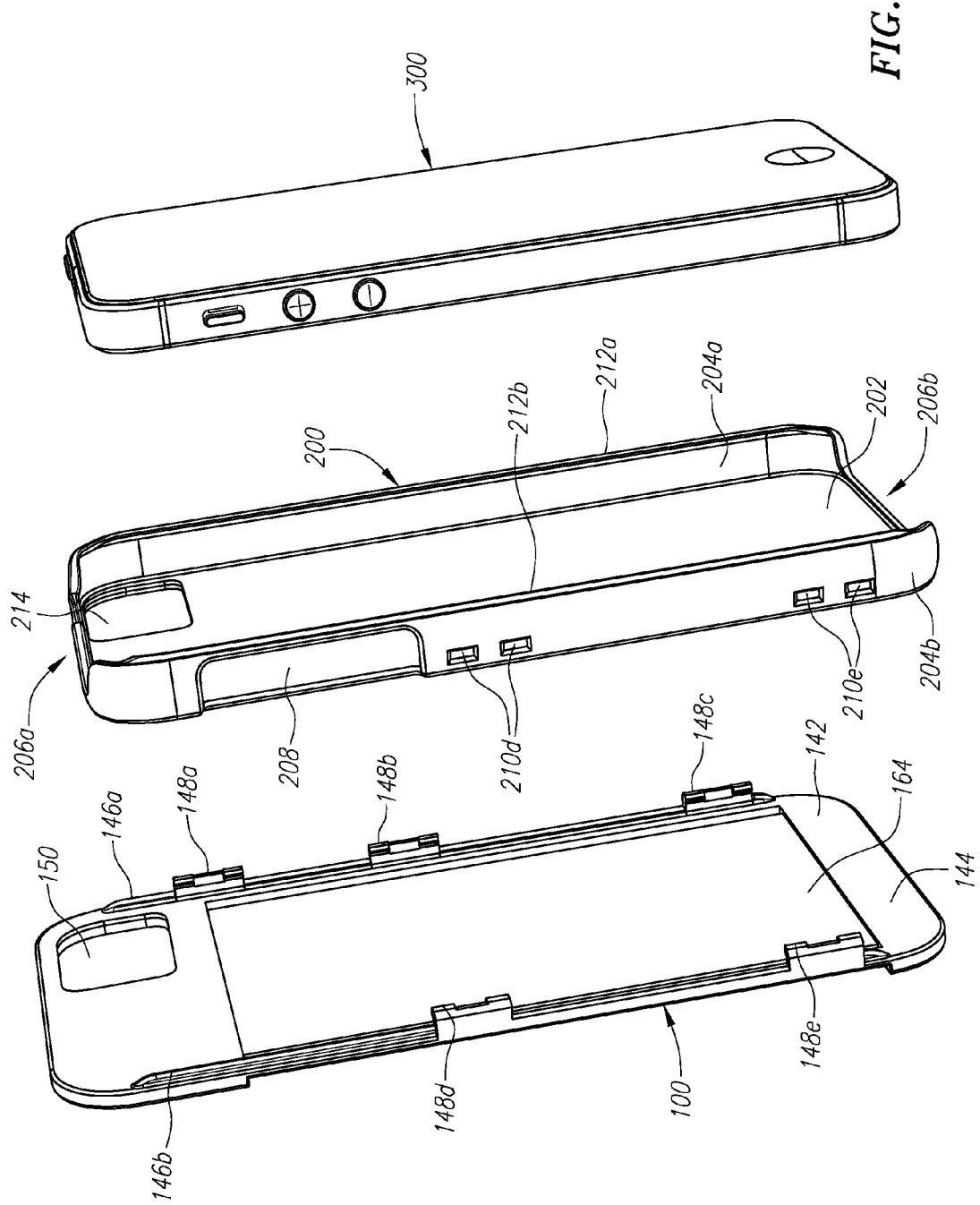
FIG. 5 shows another embodiment with a portion of an outer cover, a shell and a mobile device.
Figure 6:
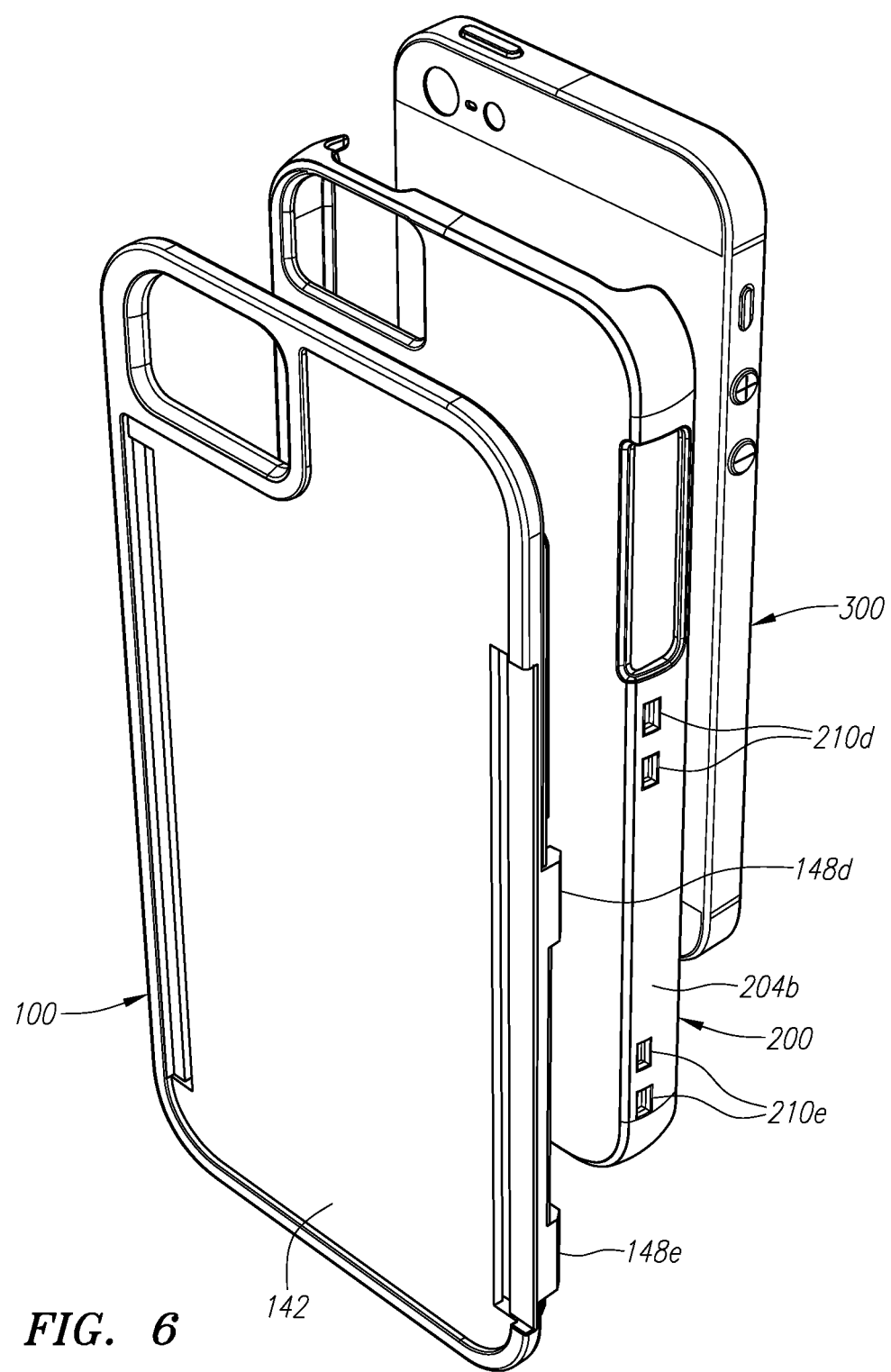
FIG. 6 shows a backside perspective of the portion of the outer cover, the shell and the mobile device of FIG. 5.
Figure 7:
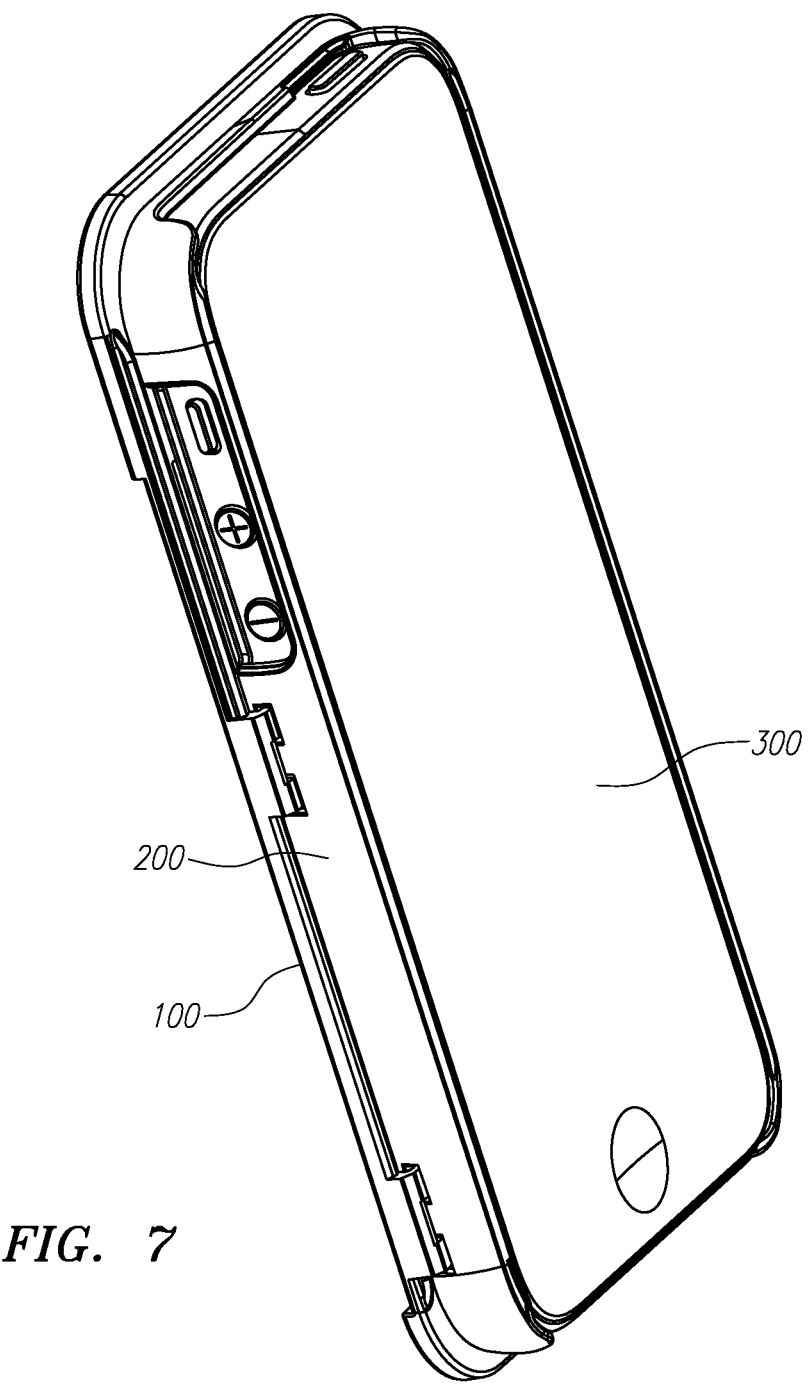
FIG. 7 shows the portion of the outer cover, the shell and the mobile device of FIG. 5 in a connected position.
Figure 8:
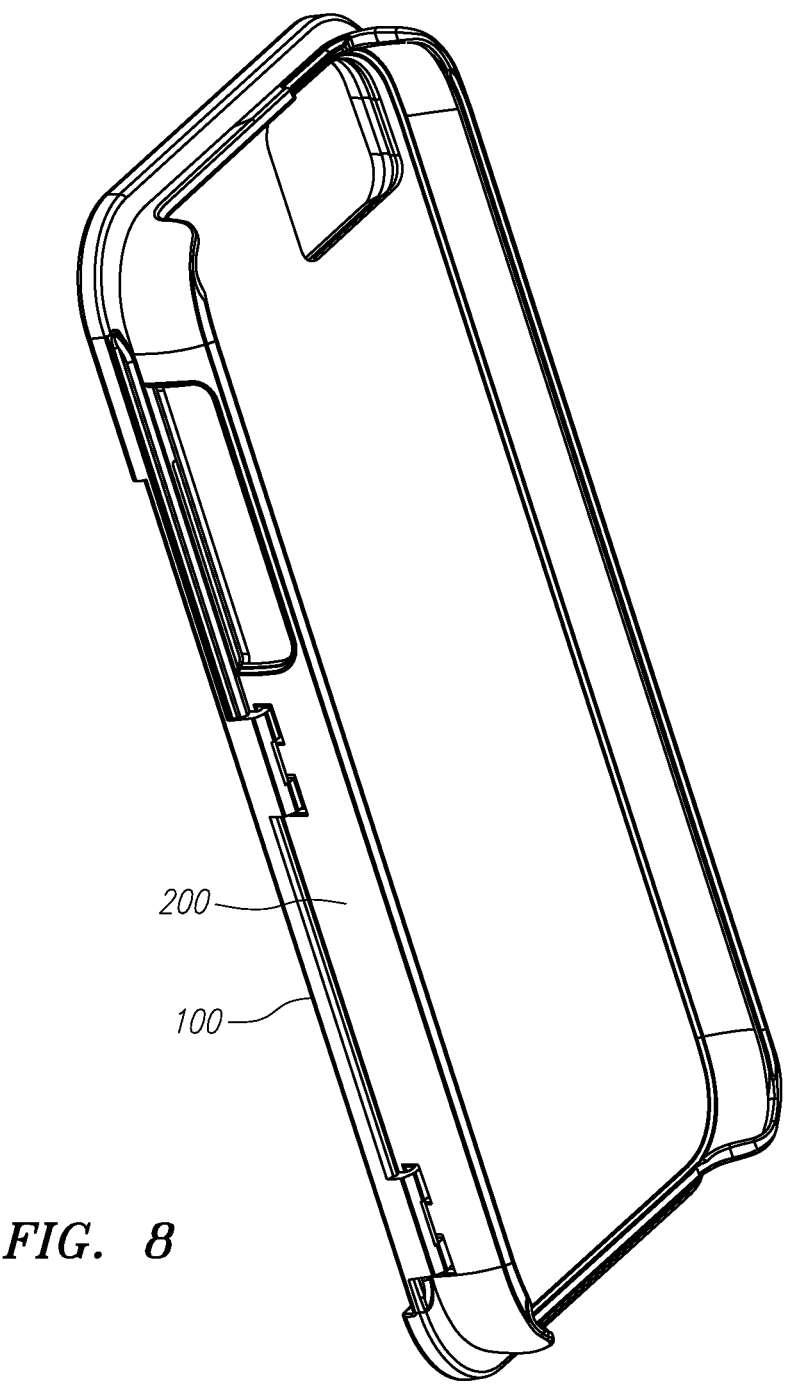
FIG. 8 shows the portion of the outer cover and the shell of FIG. 5 in a connected position without the mobile device.
Figure 9:
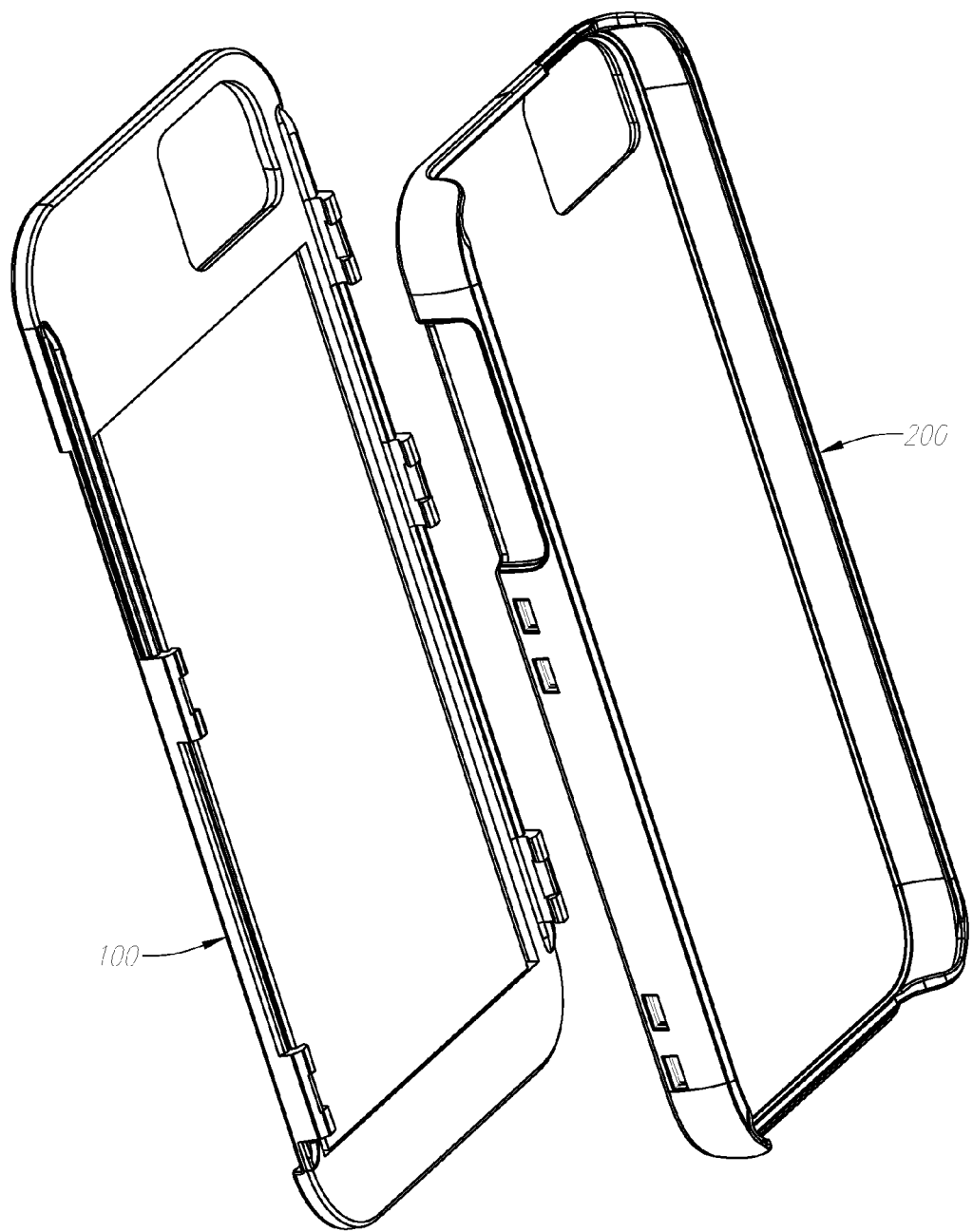
FIG. 9 is a perspective view of the portion of the outer cover and the shell of FIG. 5 disconnected from one another and without the mobile device.
Figure 10:
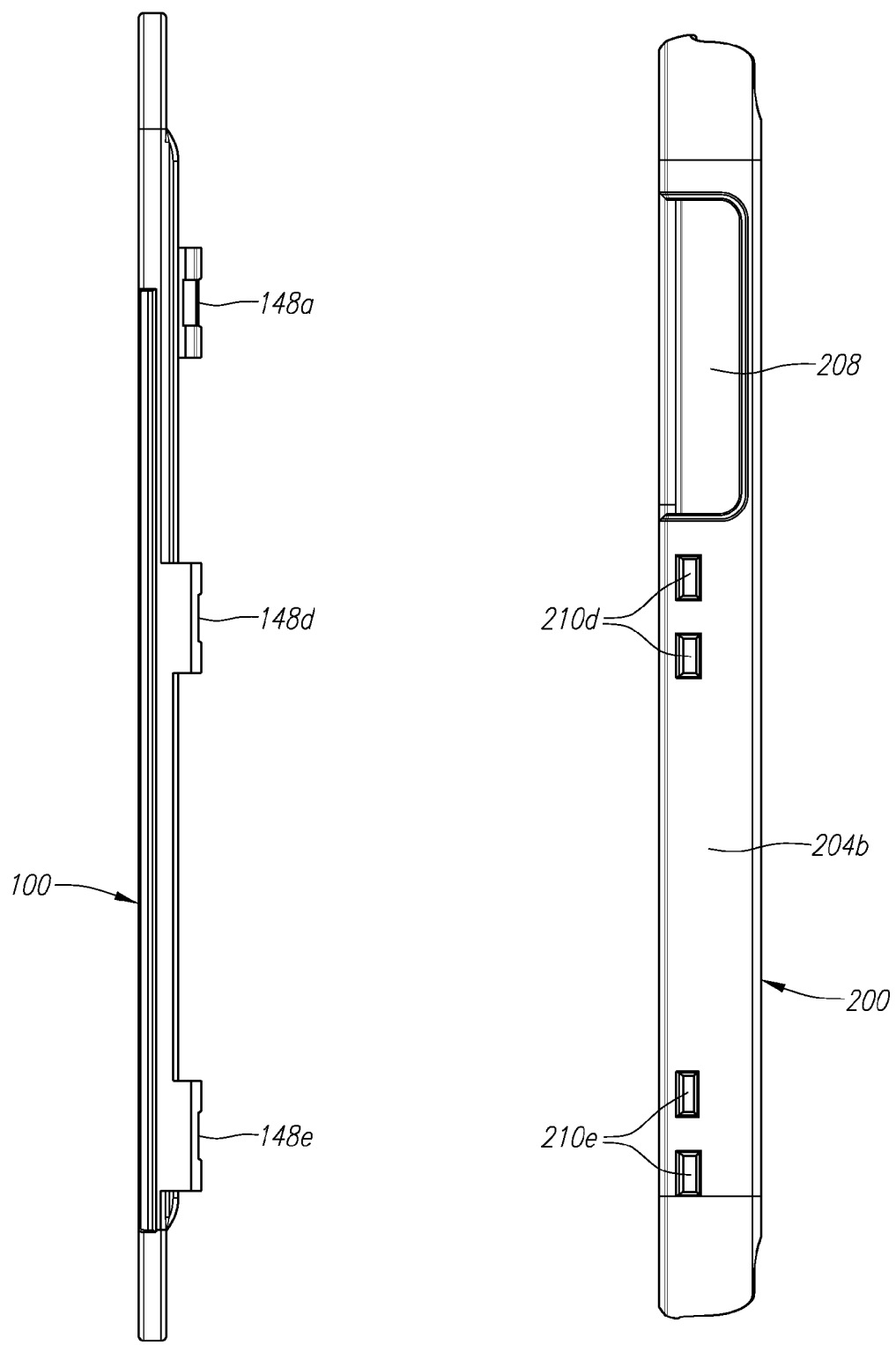
FIG. 10 is a first side view of the portion of the outer cover and the shell of FIG. 5 disconnected from one another.
Figure 11:
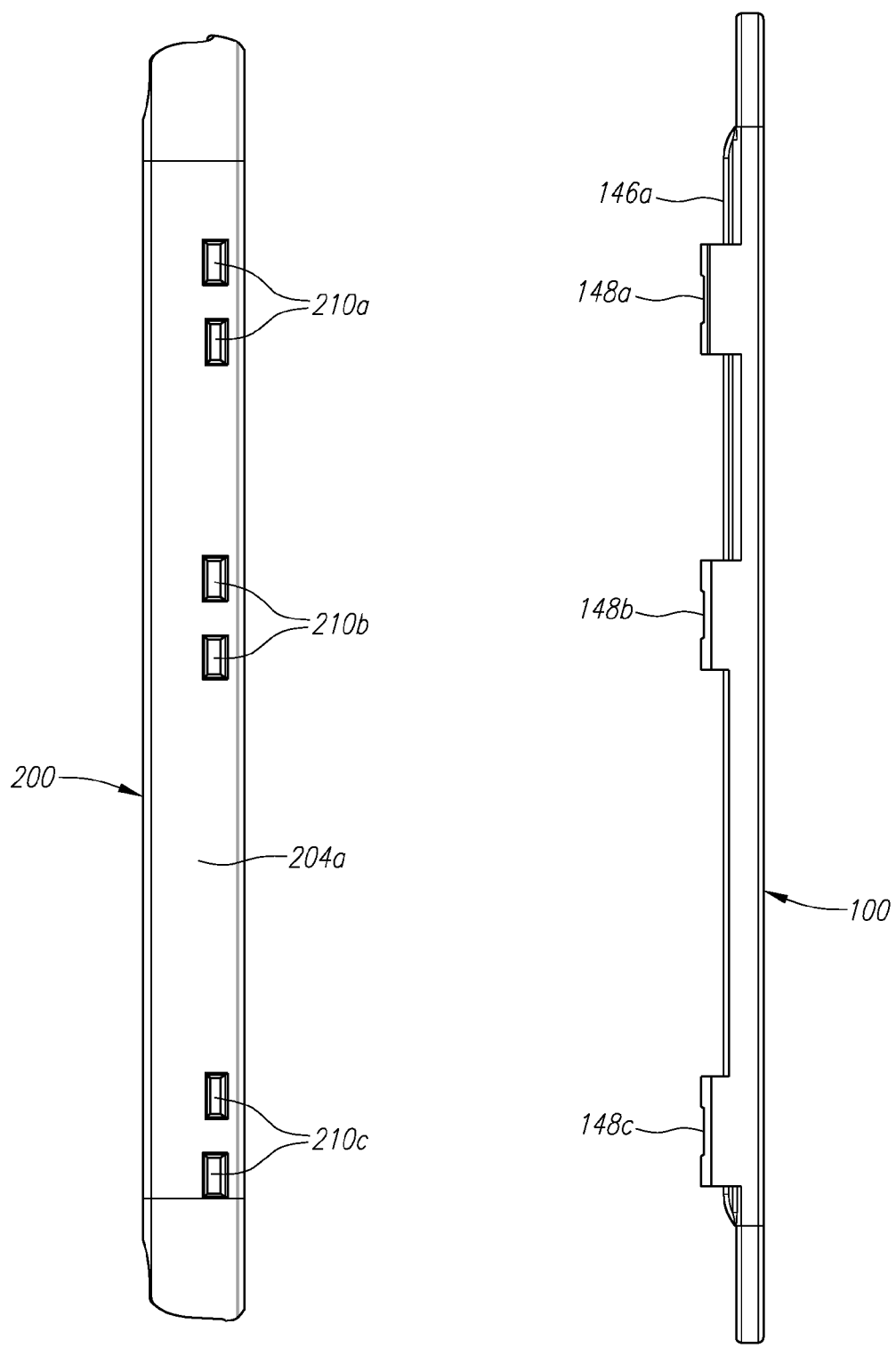
FIG. 11 is a second side view, opposite that of the first side view depicted in FIG. 10, of the portion of the outer cover and the shell of FIG. 5 disconnected from one another.
Figure 12:
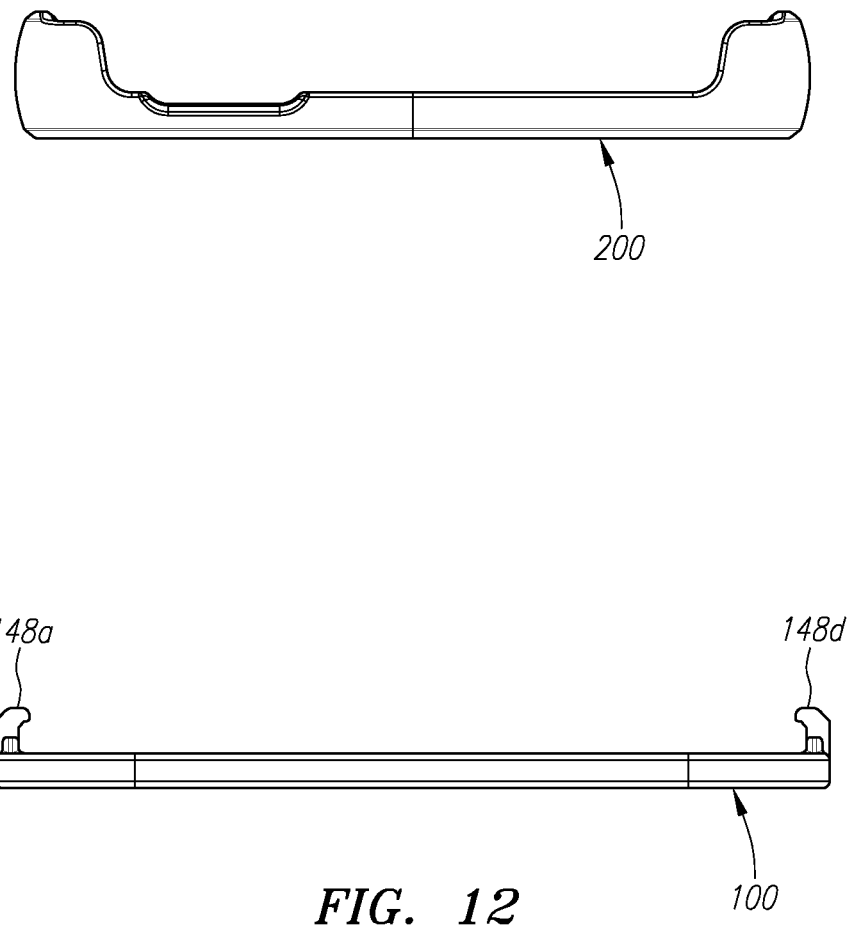
FIG. 12 is a top view of the portion of the outer cover and the shell of FIG. 5 disconnected from one another.
Figure 13:
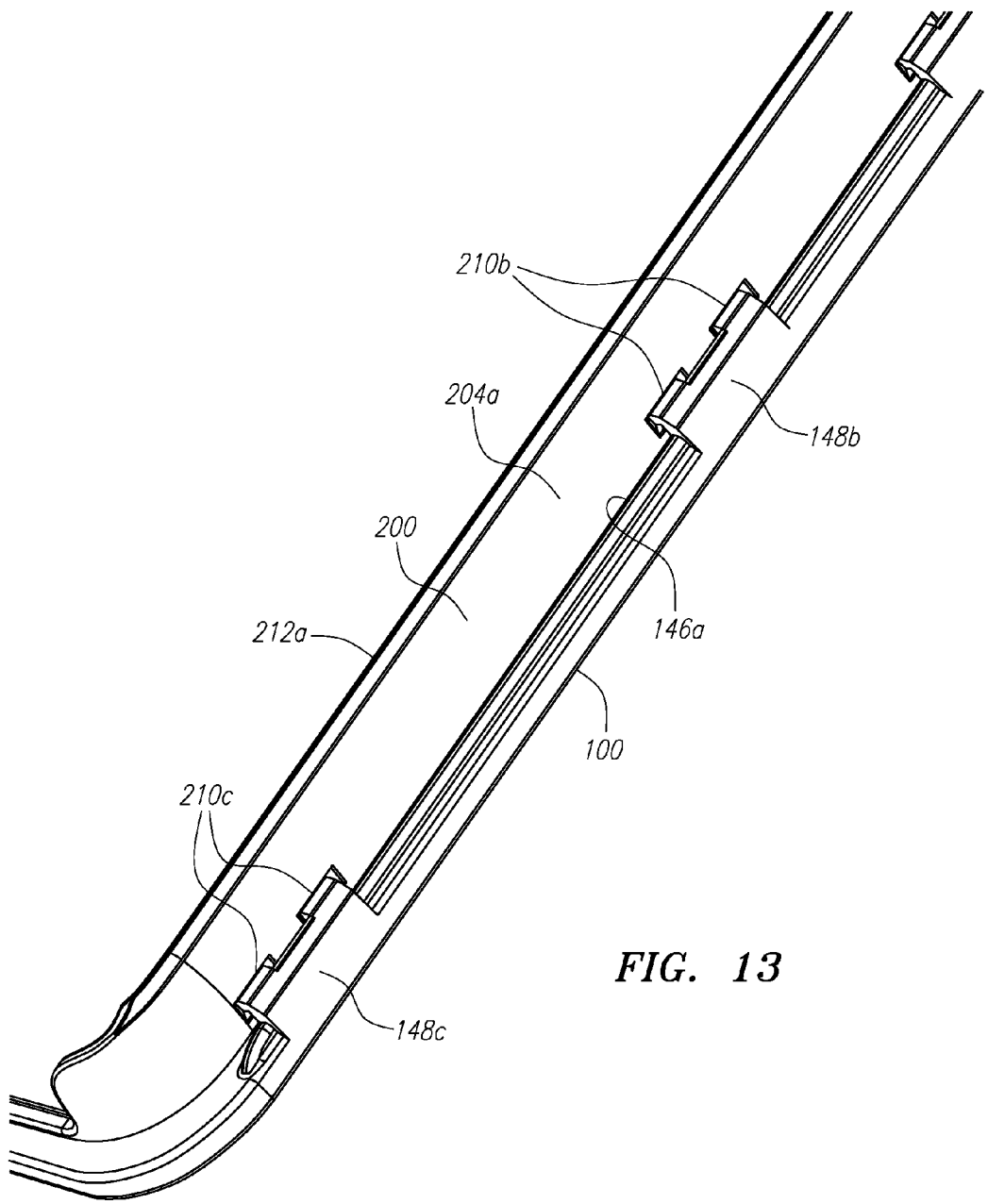
FIG. 13 is a detailed view of the second side of a portion of the outer cover and the shell of FIG. 5 connected to one another.
Figure 14:
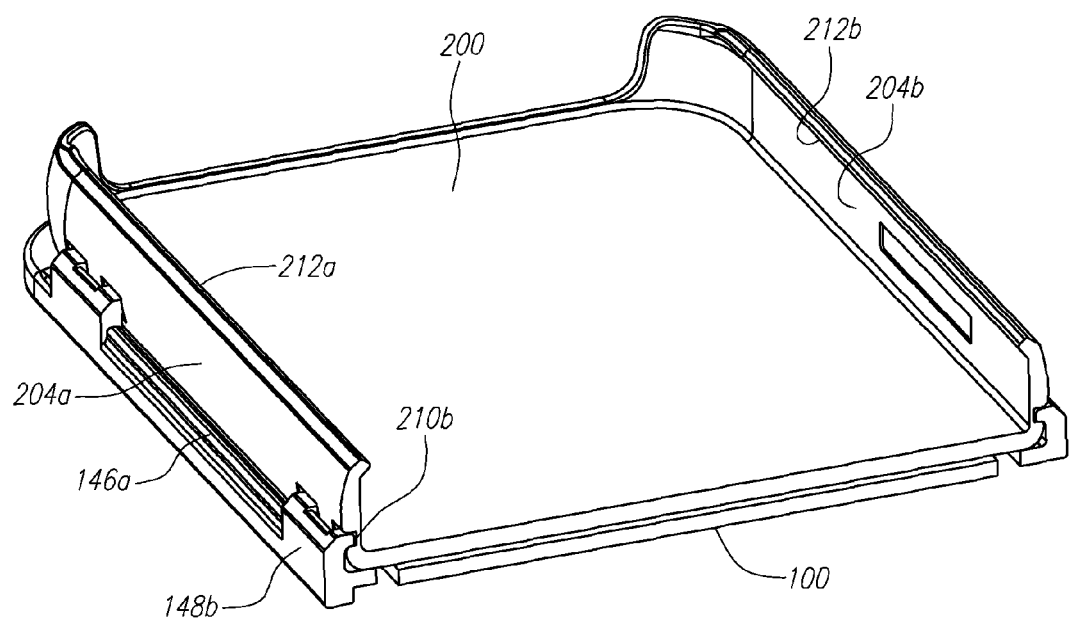
FIG. 14 is a cross-sectional view of the portion of the outer cover and the shell of FIG. 5 connected to one another as depicted in FIG. 8.
Figure 15:
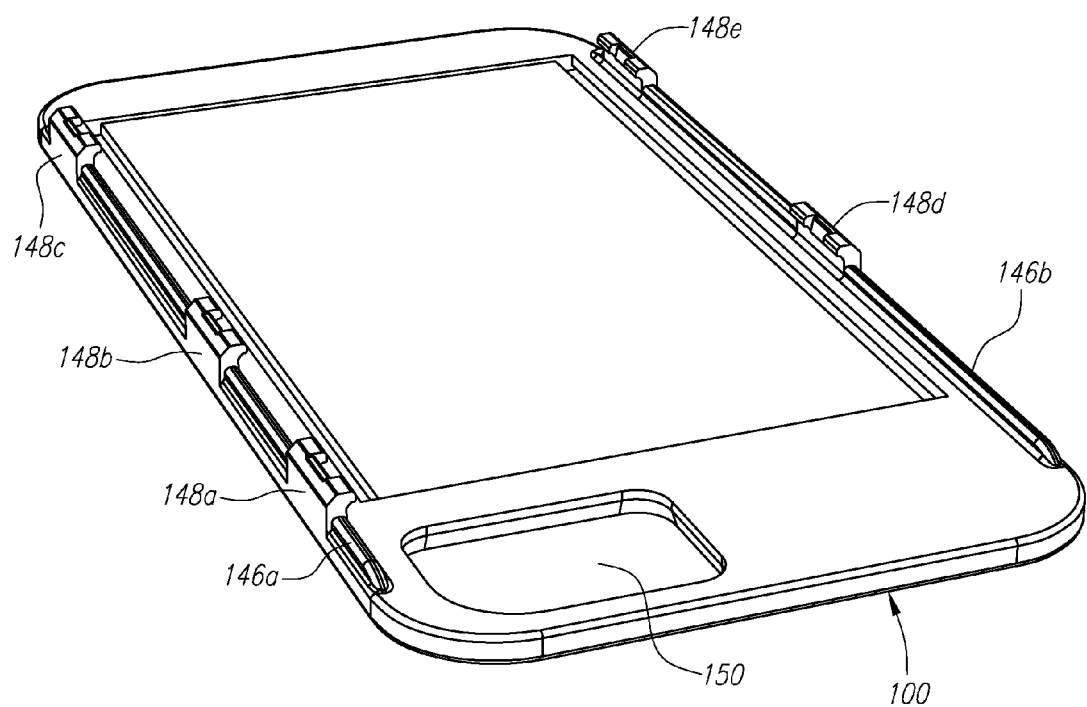
FIG. 15 is a perspective view of the portion of the outer cover of FIG. 5.

The rear panel 142 may also have retention mechanisms 148a, 148b, 148c, 148d, and 148e, which protrude from the inner surface 144 such as wings, clips, fasteners, or other such retention mechanisms known in the art which are configured to be received within retention receivers 210a, 210b, and 210c on the mobile device shell 200 (as shown in FIG. 4). The retention mechanisms 148a, 148b, 148c, 148d, and 148e thereby are configured to allow the second member 140 to be reversibly attached to the mobile device shell 200. In some embodiments, the retention mechanisms 148a, 148b, 148c, 148d, and 148e are clips which extend in a direction transverse to the rear panel 142 along the perimeter of the rear panel 142. The retention mechanisms 148a, 148b, 148c, 148d, and 148e may be made of a material of sufficient stiffness such that the retention mechanisms 148a, 148b, 148c, 148d, and 148e may deform slightly when a force is applied such as when the mobile device shell 200 is being inserted or removed. This deformation allows the mobile device shell 200 to be inserted or removed from the second member 140. The retention mechanisms 148a, 148b, 148c, 148d, and 148e may then be configured to return to its underformed shape when the mobile device shell 200 has either been fully inserted or fully removed such that, when fully inserted, the mobile device shell 200 is snugly retained on the second member 140.

In some embodiments, the rear panel 142 may also include an aperture 150 for a camera and associated components such as flash. Additional apertures may be included for other components such as speakers and microphones. With reference to FIG. 2 which is a view of the outside of the outer cover 100, in some embodiments, the outer surface 152 of the rear panel 142 may include a pocket 154 similar to pockets 128a, 128b, and 128c.

With reference back to FIG. 1, flexible member 160 is configured to attach both the first member 120 and the second member 140. Flexible member 160 has bridge 162 which in some embodiments is sized such that, when fully assembled, the first member 120 and second member 140 can be placed parallel on opposing sides of the mobile device shell 200. In some embodiments, the flexible member 160 may be attached to the first member 120 through attachment mechanisms such as, but not limited to, sewing, riveting, adhesives, or other attachment mechanisms known in the art. In some embodiments, the flexible member 160 may contain an attachment portion 164 which is attached to the inner surface 144 of the rear panel 142 via attachment mechanisms such as, but not limited to, sewing, riveting, adhesives, or other attachment mechanisms known in the art. In some embodiments, bridge 162 and attachment portion 164 form an integral unit. Flexible member 160 may be manufactured from materials such as metals, composites, plastics, rubbers, leathers, or other polymers.

FIG. 4 is an illustration of an embodiment of a mobile device shell 200 of the mobile device case assembly configured to receive a mobile device. In some embodiments, the mobile device shell 200 is sized to contain a mobile device and has a back panel 202 configured to cover at least a portion of the back surface of a mobile device.

In the illustrated embodiment, the panel 202 is configured to cover substantially the entire back surface of a mobile device. The mobile device shell 200 may additionally include a protrusion or protrusions 204a and 204b extending in a direction transverse to the back panel 202 and along the perimeter of the back panel 202 which is configured to cover at least a portion of the side surfaces of a mobile device. In the illustrated embodiment, mobile device shell 200 has two protrusions 204a and 204b covering two lateral sides of a mobile device and covering all four corner edges of a mobile device. In some embodiments, the protrusions may be a single unit extending along the entirety of the perimeter of the mobile device.

In some embodiments, protrusions 204a and 204b can extend from back panel 202 a distance slightly greater than the depth of the inserted mobile device. Additionally, in some embodiments such as that illustrated in FIG. 4, voids 206a and 206b may also be included and may be positioned to allow access to external ports on a mobile device such as, but not limited to, headphone device jacks, power ports, multi-AV ports, data ports, volume rockers or buttons, and any other such input, output, control, button, or port located on a side surface of the mobile device. In some embodiments, protrusions 204a and 204b may include additional apertures 208 configured to allow access to the above described inputs, outputs, buttons, or ports.

In some embodiments, protrusion 204a may include retention receivers 210a, 210b, and 210c, such as slots, apertures, or other retention receivers known in the art, configured to receive retention mechanisms 148a, 148b, and 148c respectively. Protrusion 204b may also include retention receivers (not shown) configured to receive retention mechanisms 148d and 148e. In some embodiments, the protrusions may include retention edges 212a and 212b extending along the edge opposite the edge connected to back panel 202. The retention protrusions may extend in a direction transverse to the protrusions in a direction towards the opposite protrusion. The retention edges 212a and 212b are configured to contact the front surface of an inserted mobile device to retain the mobile device within the mobile device shell 200. In some embodiments, the back panel 202 may also include an aperture 214 for a camera and associated components such as flash. Aperture 214 may correspond to the position and size of aperture 150. Mobile device shell 200 may be manufactured from materials such as metals, composites, plastics, rubbers, leathers, or other polymers. In some embodiments, the mobile device shell 200 may be made from a sufficiently stiff material such as plastic such that the mobile device shell 200 may deform slightly to allow insertion and removal of a mobile device and return to its undeformed shape after the mobile device has been fully inserted or fully removed.

FIGS. 5-15 are illustrative views of another embodiment of a mobile device case assembly with an outer cover 100 and a shell 200 having generally the same components as previously described. Accordingly, the outer cover 100 may include a rear panel 142 configured to be reversibly attached to a mobile device shell 200. As such, in some embodiments, the rear panel 142 is preferably dimensioned to be slightly greater than the mobile device shell 200. Rear panel 142 may be manufactured from materials such as metals, composites, plastics, rubbers, leathers, or other polymers. In some embodiments, rear panel 142 may be made of a material of sufficient stiffness such as metal or plastic to provide a greater degree of protection for the rear of the mobile device. Such material may also be slightly elastic to allow for some degree of deformation.

Like the prior embodiment, the inner surface 144 of the rear panel 142 may have raised edge protrusions 146a and 146b configured to facilitate placement of mobile device shell 200 on panel 142. In the illustrated embodiment, raised edge protrusions 146a and 146b are located along the perimeter of the rear panel 142 and may extend along the entire perimeter of the rear panel 142 or in discrete regions thereof.

The rear panel 142 may also have retention mechanisms 148a, 148b, 148c, 148d, and 148e, which protrude from the inner surface 144 such as wings, clips, fasteners, or other such retention mechanisms known in the art which are configured to be received within retention receivers 210a, 210b, 210c, 210d, and 210e on the mobile device shell 200. The retention mechanisms 148a, 148b, 148c, 148d, and 148e thereby are configured to allow the outer cover 100 to be reversibly attached to the mobile device shell 200. In some embodiments, the retention mechanisms 148a, 148b, 148c, 148d, and 148e are clips which extend in a direction transverse to the rear panel 142 along the perimeter of the rear panel 142. The retention mechanisms 148a, 148b, 148c, 148d, and 148e may be made of a material of sufficient stiffness such that the retention mechanisms 148a, 148b, 148c, 148d, and 148e may deform slightly when a force is applied such as when the mobile device shell 200 is being inserted or removed. This deformation allows the mobile device shell 200 to be inserted or removed from the outer cover 100. The retention mechanisms 148a, 148b, 148c, 148d, and 148e may then be configured to return to its underformed shape when the mobile device shell 200 has either been fully inserted or fully removed such that, when fully inserted, the mobile device shell 200 is snugly retained on the outer cover 100.

An aperture 150 for a camera and associated components such as flash may also be included the rear panel 142 and with a corresponding aperture 214 in the shell 200. Additional apertures may be included for other components such as speakers and microphones.

The mobile device shell 200 of the mobile device case assembly in FIGS. 5-15 is similarly configured to receive a mobile device 300. The mobile device shell 200 is sized to contain the mobile device 300 and has a back panel 202 configured to cover at least a portion of the back surface of a mobile device 300.

As illustrated, the panel 202 is configured to cover substantially the entire back surface of a mobile device 300. The mobile device shell 200, like the prior embodiment, may additionally include protrusions 204a and 204b extending in a direction transverse to the back panel 202 and along the perimeter of the back panel 202 which is configured to cover at least a portion of the side surfaces of a mobile device 300. In the illustrated embodiment, mobile device shell 200 has two protrusions 204a and 204b covering two lateral sides of a mobile device and covering all four corner edges of a mobile device, however, as previously noted other configurations may be employed that extend from different perimeter regions and or along the entirety of the perimeter of the back panel, which alone or in combination with protrusions extending from the rear panel 142 may cover each or some of the four perimeter side walls of the mobile device in part or entirely.

As previously noted, protrusions 204a and 204b may extend from back panel 202 a distance slightly greater than the depth of the inserted mobile device and. Voids 206a and 206b may also be included and may be positioned to allow access to external ports on a mobile device such as, but not limited to, headphone device jacks, power ports, multi-AV ports, data ports, volume rockers or buttons, and any other such input, output, control, button, or port located on a side surface of the mobile device. Additional apertures 208 configured to allow access to the above described inputs, outputs, buttons, or ports may also be included.

As illustrated, the protrusion 204a may also include retention receivers 210a, 210b, and 210c, such as slots, apertures, or other retention receivers known in the art, configured to receive retention mechanisms 148a, 148b, and 148c respectively. Protrusion 204b may also include retention receivers 148d and 148e configured to receive retention mechanisms 148d and 148e. The protrusions may include retention edges 212a and 212b extending along the edge opposite the edge connected to back panel 202. As illustrated, the retention protrusions may extend in a direction transverse to the protrusions in a direction towards the opposite protrusion and be configured to contact the front surface of an inserted mobile device 300 to retain the mobile device within the mobile device shell 200. Mobile device shell 200 may be manufactured as previously described.

Figure 16:
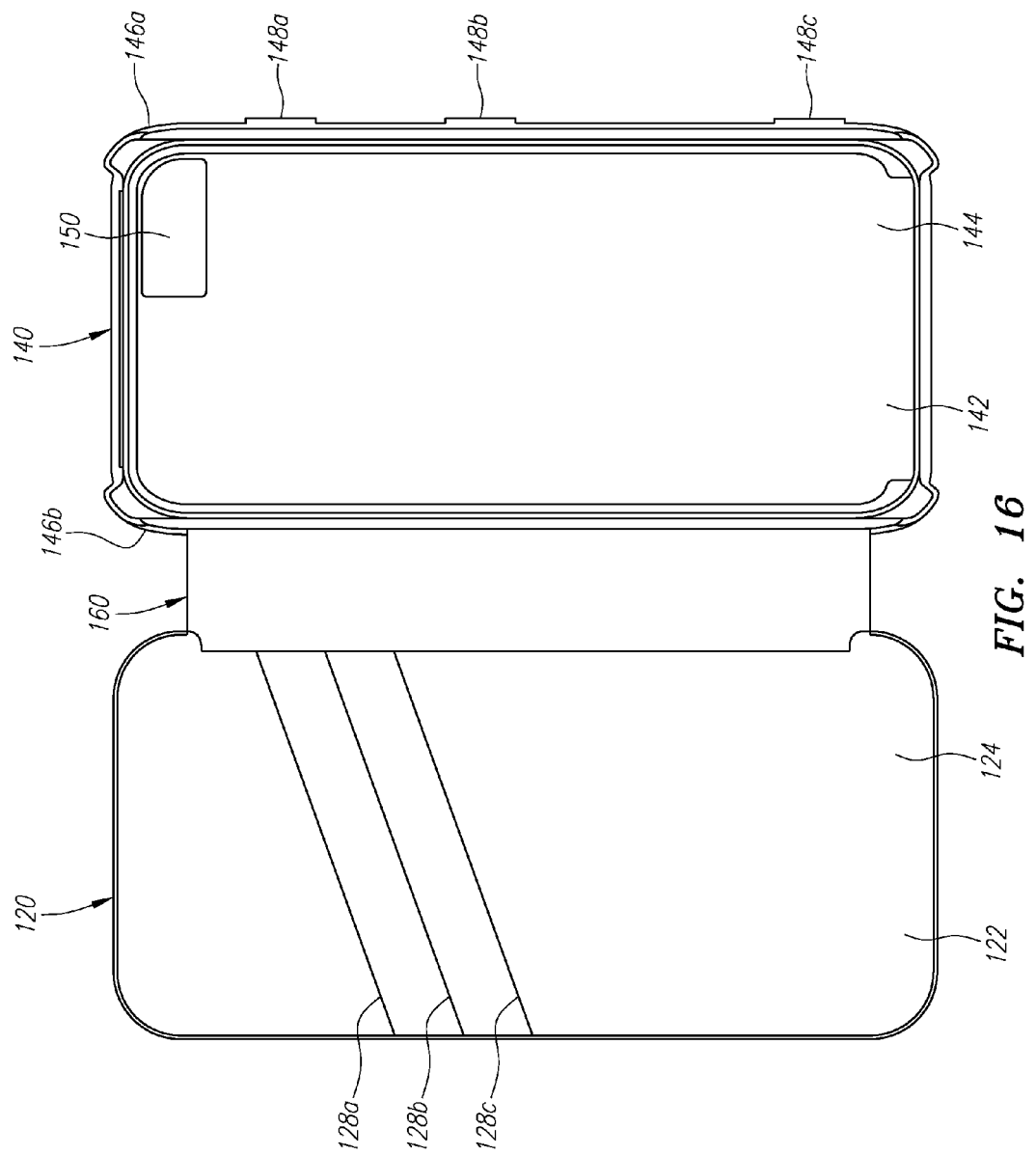
FIG. 16 is a front view of the interior side of another embodiment of a case which shows the inner surfaces of an outer cover and a shell component connected to one another.
Figure 17:
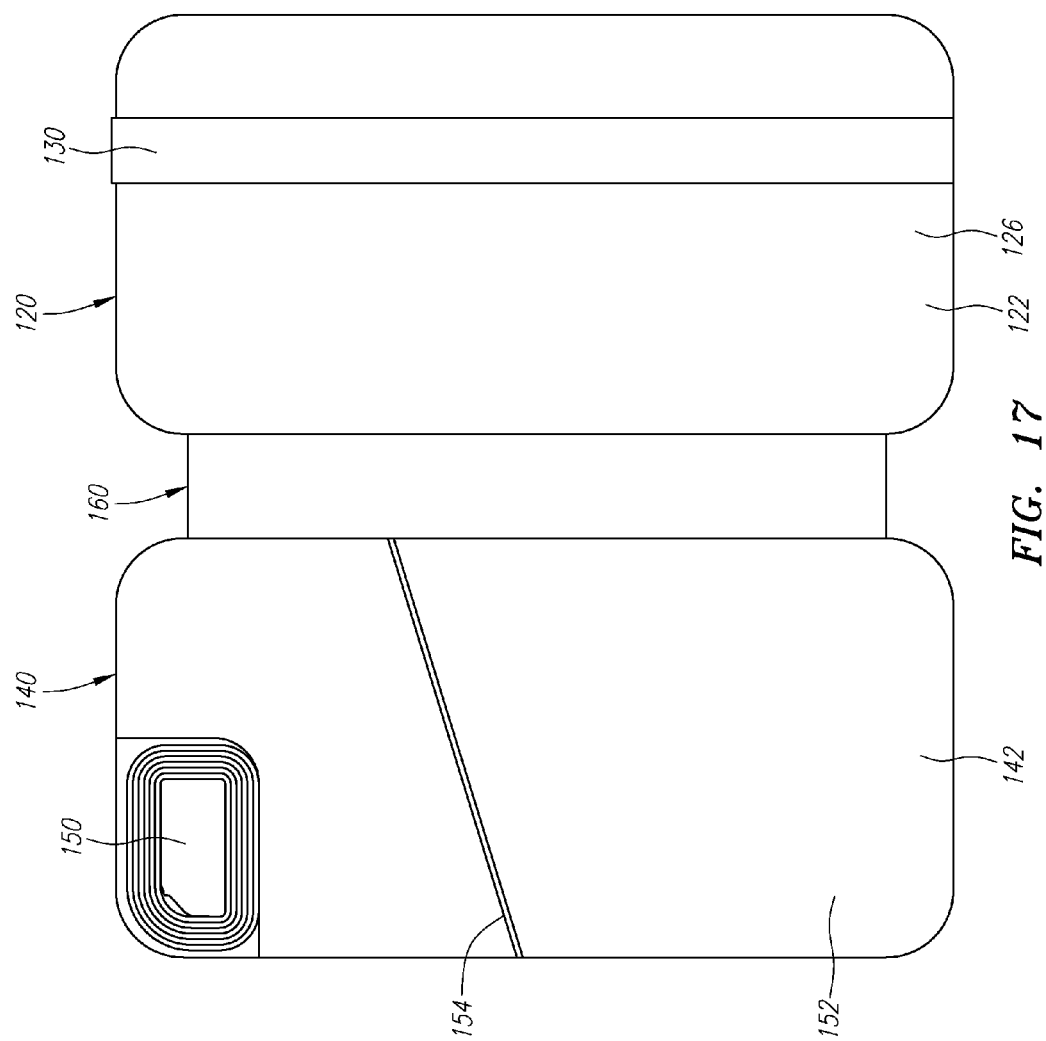
FIG. 17 is a back view of the outside of the case of FIG. 16 which shows the outer surfaces of the outer cover.
Figure 18:
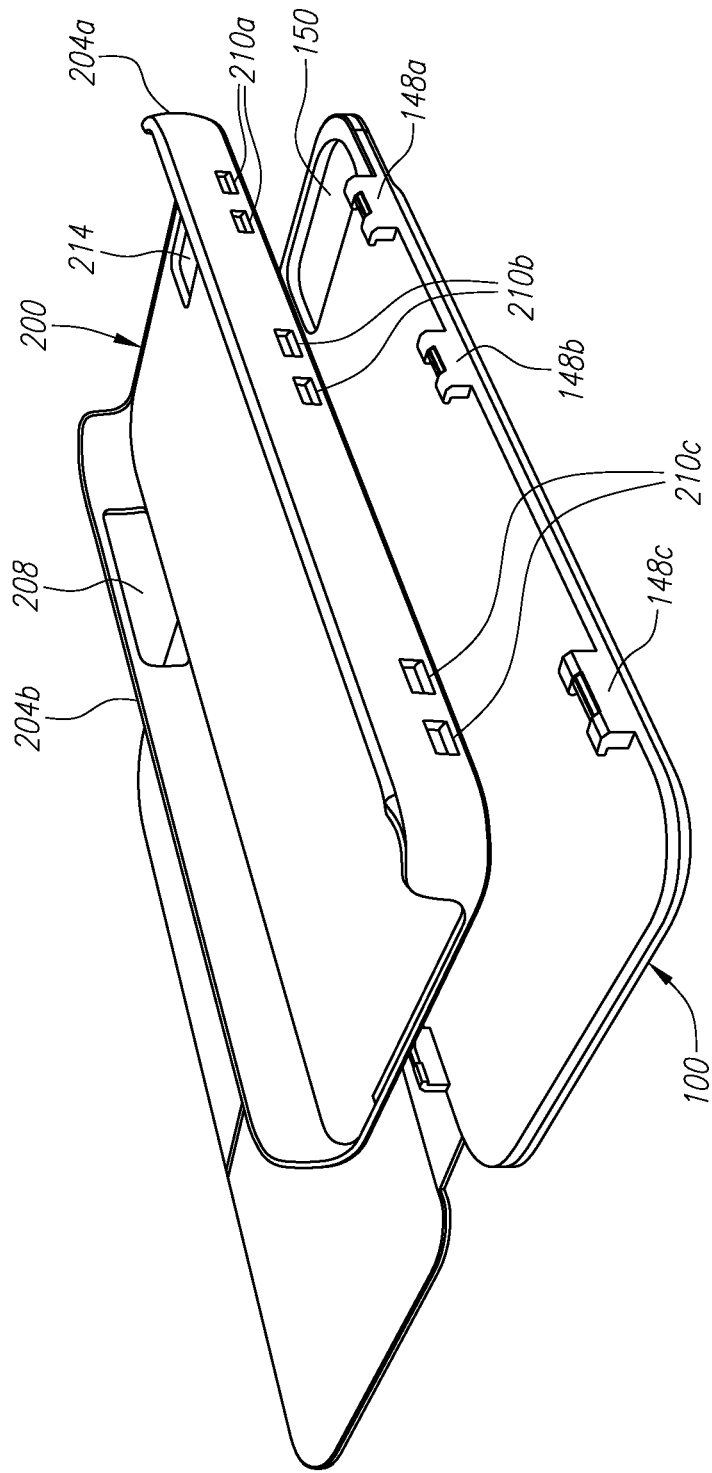
FIG. 18 is a perspective view of the case of FIG. 16 which shows shell separated from the outer cover.

FIGS. 16-18 are illustrative views of another embodiment of a protective case for mobile device having an outer cover 100 and a shell 200. The embodiment illustrated in FIGS. 16-18 is similar to that in FIGS. 1-4, but as illustrated, employs a shell 200 and rear panel 142 form factor or implementation like that depicted in FIGS. 5-15.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A mobile device case assembly configured to provide protection for a mobile device, the mobile device case assembly comprising:
   an outer cover comprising:
      a first member comprising a front panel;
      a second member comprising a first raised edge protrusion and a second raised edge protrusion attached to opposite edges of a rigid rear panel, each of the first and second raised edge protrusions extending in a direction transverse to the rigid rear panel and including at least one retention mechanism; and
      a flexible member including a bridge portion connected to an edge of the first member and an attachment portion attached to the rigid rear panel between the first and second raised edge protrusions;
   a mobile device shell dimensioned to receive and retain the mobile device, the mobile device shell comprising:
      a back panel;
      a first sidewall and a second sidewall extending in a direction transverse to the back panel along opposite edges of the back panel, the first and second sidewalls defining a cavity dimensioned to receive the mobile device, each of the first and second sidewalls including at least one retention receiver;
   wherein each retention receiver is configured to receive the at least one retention mechanism, fixing the mobile device shell to the second member without restraining the first member; and
   wherein the flexible member is configured to enable the first member to move from a first position side-by-side with the second member to a second position on the opposing side of the mobile device shell from the second member.

2. The mobile device case assembly of claim 1, wherein the retention mechanism comprises clips which extend from the raised edge portions.

3. The mobile device case assembly of claim 1, wherein the first member further comprises pockets.

4. The mobile device case assembly of claim 3, wherein the pockets are sized to receive items such as credit cards, business cards, and currency.

5. The mobile device case assembly of claim 1, wherein the first member further comprises an elongate strap.

6. The mobile device case assembly of claim 5, wherein the elongate strap is made from an elastic material and configured to lock the mobile device case assembly.

7. The mobile device case assembly of claim 1, wherein the retention receivers are located on an outer surface of the sidewalls.

8. The mobile device case assembly of claim 2, wherein the retention receivers comprise slots.

9. The mobile device case assembly of claim 1, wherein the mobile device shell further comprises voids and apertures configured to allow access to ports and other functional devices on the mobile device.

10. The mobile device case assembly of claim 1, wherein the first member of the outer cover further comprises a first aperture, and wherein the back panel of the mobile device shell further comprises a second aperture corresponding to the position and size of the first aperture.

11. The mobile device case assembly of claim 1 wherein the back panel is slightly longer and wider than a rear surface of the mobile device.

12. The mobile device case assembly of claim 11 wherein the rigid rear panel is slightly longer and wider than a rear surface of the mobile device.

13. A mobile device case assembly configured to provide protection for a mobile device, the mobile device case assembly comprising:
   an outer cover having:
      a first raised edge protrusion and a second raised edge protrusion attached to opposite edges of a stiff panel, each of the first and second raised edge protrusions extending in a direction transverse to the stiff panel and including at least one retention mechanism; and
      a front cover connected to a flexible member, at least a portion of the flexible member being attached to an inner surface of the stiff panel between the first raised edge protrusion and the second raised edge protrusion; and
   a stiff mobile device shell comprising:
      a back panel;
      at least one sidewall extending in a direction transverse to the back panel along the perimeter of the back panel; and
      at least one retention receiver located on an outer surface of the at least one sidewall, the retention receiver configured to receive the at least one retention mechanism, fixing the mobile device shell to the outer cover.

14. The mobile device case assembly of claim 13, wherein the at least one sidewall of the mobile device shell further comprises one or more apertures positioned and dimensioned to allow user access to the mobile device.

15. The mobile device case assembly of claim 13, wherein the back panel of the mobile device shell further comprises an aperture for a camera or associated components on the mobile device.

16. The mobile device case assembly of claim 13, wherein the at least one sidewall of the mobile device shell extends along the entire perimeter of the stiff panel.

17. The mobile device case assembly of claim 13, wherein the flexible member being configured to enable the front cover to move from a first position side-by-side with the stiff panel to a second position on the opposing side of the stiff mobile device shell from the stiff panel.

18. The mobile device case assembly of claim 17, wherein the back panel is slightly longer and wider than a rear surface of the mobile device.

19. The mobile device case assembly of claim 13 wherein the retention mechanism of the outer cover and the retention receiver of the shell are configured to be reversibly snapped together to fixedly position the shell relative to the back panel of the outer cover.

\* \* \* \* \*